United States Patent
Kobatake et al.

(10) Patent No.: US 12,318,838 B2
(45) Date of Patent: Jun. 3, 2025

(54) DISPERSION MEDIUM FOR METAL PARTICLE SINTERING, AND ELECTROCONDUCTIVE PASTE

(71) Applicant: DAICEL CORPORATION, Osaka (JP)

(72) Inventors: Takanori Kobatake, Tokyo (JP); Katsuaki Suganuma, Suita (JP); Shuhei Takata, Suita (JP)

(73) Assignee: DAICEL CORPORATION, Osaka (JP)

(*) Notice: Subject to any disclaimer, the term of this patent is extended or adjusted under 35 U.S.C. 154(b) by 39 days.

(21) Appl. No.: 17/799,961

(22) PCT Filed: Feb. 2, 2021

(86) PCT No.: PCT/JP2021/003617
§ 371 (c)(1),
(2) Date: Aug. 16, 2022

(87) PCT Pub. No.: WO2021/166627
PCT Pub. Date: Aug. 26, 2021

(65) Prior Publication Data
US 2023/0077759 A1    Mar. 16, 2023

(30) Foreign Application Priority Data
Feb. 19, 2020   (JP) ................. 2020-025765

(51) Int. Cl.
*B22F 1/00* (2022.01)
*H01B 1/22* (2006.01)

(52) U.S. Cl.
CPC .......... *B22F 1/00* (2013.01); *H01B 1/22* (2013.01)

(58) Field of Classification Search
CPC ..... H01B 1/00; H01B 1/22; B22F 1/00; B22F 1/103
See application file for complete search history.

(56) References Cited

U.S. PATENT DOCUMENTS

| 2011/0020170 A1* | 1/2011 | Luinstra | .................. | C01G 7/00 420/466 |
| 2014/0065387 A1* | 3/2014 | Andre | .................... | C08L 71/00 428/209 |
| 2019/0062582 A1* | 2/2019 | Keoshkerian | ....... | C23C 18/1692 |

FOREIGN PATENT DOCUMENTS

| JP | 2018-156736 A | 10/2018 |
| JP | 2018-170228 A | 11/2018 |
| TW | 201829652 A | 8/2018 |

OTHER PUBLICATIONS

CN 104538085 (pub Apr. 22, 2015) English language machine translation.*
Zou et al "Highly efficient hydrogen generation from a formic acid/triethanolamine system using a Pd-based catalyst and correlation for apparent activation energy estimation", Ind. Eng. Chem. Res. 2019, 58, 22984-22995.*
International Preliminary Report on Patentability and Written Opinion of the International Searching Authority for International Application No. PCT/JP2021/003617, dated Aug. 23, 2022, with an English translation.
International Search Report for International Application No. PCT/JP2021/003617, dated Mar. 23, 2021, with an English translation.
Taiwanese Office Action and Search Report for Taiwanese Application No. 110104681, dated Jun. 6, 2024, (No English language translation provided).
Extended European Search Report for European Application No. 21757086.0. dated Jan. 31, 2024.

* cited by examiner

*Primary Examiner* — Mark Kopec
(74) *Attorney, Agent, or Firm* — Birch, Stewart, Kolasch & Birch, LLP

(57) ABSTRACT

Provided are a dispersion medium for metal particle sintering that gives an electroconductive paste whereby metal particles are satisfactorily sintered at a low temperature even when not in a reducing atmosphere, and an electroconductive paste in which the dispersion medium is used. The dispersion medium for metal particle sintering according to an embodiment of the present disclosure contains formic acid and a basic compound, the basic compound being a nitrogen-containing compound represented by Formula (1), and a molar ratio (basic group/formic acid) of basic groups included in the basic compound to formic acid being from 0.50 to 1.20. [Formula 1] In Formula (1): $R^a$ to $R^c$ are the same or different and each represent a hydrogen atom or a hydrocarbon group that may have a substituent; the double line including a dashed line represents a single bond or a double bond, with $R^c$ being absent in the case of a double bond; and any two of $R^a$ to $R^c$ may bond with each other and form a ring together with the adjacent nitrogen atom.

[Formula 1]

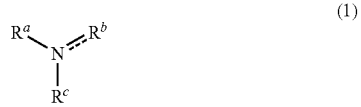

(1)

18 Claims, No Drawings

DISPERSION MEDIUM FOR METAL PARTICLE SINTERING, AND ELECTROCONDUCTIVE PASTE

TECHNICAL FIELD

The invention according to the present disclosure relates to a dispersion medium for metal particle sintering, and an electroconductive paste. The present application claims priority to JP 2020-025765 filed in Japan on Feb. 19, 2020, the content of which is incorporated herein.

BACKGROUND ART

In the production of electronic devices such as printed wiring boards, capacitors, inductors, varistors, thermistors, transistors, speakers, actuators, antennas, solid oxide fuel cells, and hybrid ICs, electroconductive pastes are used as materials for semiconductor bonding, wire bonding, clip bonding, wiring formation, bump formation, and the like.

Metal particles such as copper particles used in the electroconductive pastes tend to form an oxide film, which inhibits sintering, on the particle surface. As such, there have been studies on an electroconductive paste using metal particles that are coated with an organic substance and in which the formation of an oxide film is suppressed. Examples thereof include a copper paste for bonding containing copper particles coated with an organic protective agent and a dispersion medium (Patent Document 1) and a composition for forming a conductor containing copper-containing particles, an organic acid, and a dispersion medium, the copper-containing particles being coated with an organic substance containing an alkylamine having a hydrocarbon group having 7 or less carbons (Patent Document 2).

However, these electroconductive pastes have problems such as complicated coating process and increased cost associated with coating with an organic substance; there are also other problems, such as the necessity of high temperature firing to remove the coating film, or the necessity of introducing a reducing gas such as formic acid to promote sintering.

CITATION LIST

Patent Document

Patent Document 1: JP 2018-156736 A
Patent Document 2: JP 2018-170228 A

SUMMARY OF INVENTION

Technical Problem

In order to solve the above problems, the present inventors focused on an azeotropic composition containing formic acid [(formic acid/triethylamine) molar ratio: 5/2] and attempted to use the azeotropic composition as a dispersion medium that can supply a reducing gas (formic acid) during firing. However, with the paste in which the azeotropic composition was used, a good sintered body could not be produced due to corrosion of metal particles; in addition, the metal particles aggregated, significantly reducing the storage stability.

Accordingly, an object of the present disclosure is to solve the problems described above and provide a dispersion medium for metal particle sintering that gives an electroconductive paste, the electroconductive paste yielding a sintered body that exhibits good electroconductivity and bonding strength even when not in a reducing atmosphere and having excellent storage stability. Another object of the present disclosure is to provide a dispersion medium for metal particle sintering that gives an electroconductive paste in which formic acid volatilizes in a high temperature range of 100° C. or higher, the electroconductive paste yielding a sintered body that exhibits good electroconductivity and bonding strength even when not in a reducing atmosphere and having excellent storage stability. In addition, another object of the present disclosure is to provide an electroconductive paste in which the dispersion medium is used.

Solution to Problem

As a result of diligent studies to solve the problems described above, the present inventors found that, when a mixture containing a basic compound and formic acid in a specific molar ratio is used as a dispersion medium in an electroconductive paste, corrosion of metal particles due to formic acid is suppressed, a good sintered body can be achieved even when the atmosphere is not a reducing atmosphere, and aggregation of metal particles can be suppressed. The invention according to the present disclosure was completed based on these findings.

That is, the present disclosure provides a dispersion medium for metal particle sintering, the dispersion medium containing formic acid and a basic compound, the basic compound being a nitrogen-containing compound represented by Formula (1), and a molar ratio (basic group/formic acid) of basic groups included in the basic compound to formic acid being from 0.50 to 1.20.

[Formula 1]

where $R^a$ to $R^c$ are the same or different and each represent a hydrogen atom or a hydrocarbon group that may have a substituent; the substituent is the same or different, and is at least one group selected from the group consisting of an amino group, an N-substituted amino group, an N,N-substituted amino group, an imino group, an N-substituted imino group, and a hydroxyl group; however, $R^a$ to $R^c$ are not hydrogen atoms at the same time; the double line including a dashed line represents a single bond or a double bond, with $R^c$ being absent in the case of a double bond; any two of $R^a$ to $R^c$ may bond with each other and form a ring together with the adjacent nitrogen atom.

The present disclosure also provides an electroconductive paste containing metal particles and the dispersion medium described above.

The electroconductive paste preferably has a viscosity ratio (viscosity after storage/viscosity immediately after mixing) of 10.0 or less. The viscosity after storage is a viscosity (25° C., a shear rate of 10 s$^{-1}$) of the electroconductive paste measured by a rheometer after storage at 25° C. or lower for 7 days. The viscosity immediately after mixing is a viscosity (25° C., a shear rate of 10 s$^{-1}$) of the electroconductive paste measured by a rheometer immediately after mixing the metal particles and the dispersion medium.

The electroconductive paste preferably has a maximum peak temperature from 100 to 220° C. in a derivative thermogravimetry (DTG) in a nitrogen atmosphere with a temperature increase rate of 10° C./min.

The metal particles are preferably at least one type selected from the group consisting of copper particles, silver particles, and particles of an oxide thereof.

The metal particles preferably have a volume average particle size from 1 nm to 100 μm.

Advantageous Effects of Invention

By the blending of formic acid, the dispersion medium according to an embodiment of the present disclosure reduces the metal particles and promotes sintering even when in an inert atmosphere instead of a reducing atmosphere. Furthermore, formic acid is neutralized and stabilized by a sufficient amount of basic groups, preventing corrosion of the metal particles and ensure storage stability of the electroconductive paste. In the electroconductive paste according to an embodiment of the present disclosure, formic acid and the basic compound form an azeotropic composition, preventing drying of the electroconductive paste. In addition, since volatilization of formic acid occurs in a high temperature range of 100° C. or higher, sintering of the metal particles is promoted. Further, the amount of organic residue is very small after volatilization of formic acid and the basic compound, enabling production of a sintered body exhibiting good electroconductivity even at a low temperature of approximately 200° C. Also, the electroconductive paste according to an embodiment of the present disclosure can yield a high bonding strength even at a low temperature of approximately 200° C. and a slight pressure of 1 MPa or less.

DESCRIPTION OF EMBODIMENTS

Dispersion Medium

The dispersion medium for metal particles sintering in an embodiment of the present disclosure contains formic acid and a basic compound in a molar ratio (basic group/formic acid) of basic groups included in the basic compound to formic acid from 0.50 to 1.20.

Formic Acid

The formic acid in an embodiment of the present disclosure and the basic compound described below are dissolved in each other and serve as a dispersion medium for metal particles. In addition, the formic acid in an embodiment of the present disclosure reduces an oxide film on the surface of metal particles and promotes sintering of metal particles.

Formic acid or a mixed solution containing formic acid can be used to give the molar ratio (basic group/formic acid) from 0.50 to 1.20 of formic acid in the dispersion medium according to an embodiment of the present disclosure. Of which, from the viewpoint of the ease of handling, a mixed solution containing 50 wt. % or greater of formic acid is preferable, and a formic acid-triethylamine azeotropic composition (for example, formic acid: triethylamine=5:2 (molar ratio)), a 98% aqueous solution of formic acid, or an 88% aqueous solution of formic acid or the like is more preferable.

Basic Compound

The basic compound in an embodiment of the present disclosure in the electroconductive paste raises the volatilization temperature of formic acid, makes miscible material a good dispersion medium, and suppresses corrosion of the surface of metal particles by formic acid.

The basic compound used in an embodiment of the present disclosure is a nitrogen-containing compound represented by Formula (1) below.

[Formula 1]

wherein $R^a$ to $R^c$ are the same or different and each represent a hydrogen atom or a hydrocarbon group that may have a substituent; the substituent is the same or different, and is at least one group selected from the group consisting of an amino group, an N-substituted amino group, an N,N-substituted amino group, an imino group, an N-substituted imino group, and a hydroxyl group; however, $R^a$ to $R^c$ are not hydrogen atoms at the same time; the double line including a dashed line represents a single bond or a double bond, with $R^c$ being absent in the case of a double bond; any two of $R^a$ to $R^c$ may bond with each other and form a ring together with the adjacent nitrogen atom.

Examples of the hydrocarbon group related to IV to $R^a$ include an aliphatic hydrocarbon group, an alicyclic hydrocarbon group, and an aromatic hydrocarbon group, of which an aliphatic hydrocarbon group and an alicyclic hydrocarbon group are preferred, and an aliphatic hydrocarbon group is more preferred.

Examples of the aliphatic hydrocarbon group include a linear or branched alkyl group, a linear or branched alkenyl group, a linear or branched alkynyl group, and a linear or branched alkylidene group, of which a linear or branched alkyl group is preferable.

The linear or branched alkyl group is preferably a linear alkyl group having from 1 to 12 carbons, more preferably from 1 to 8 carbons, and even more preferably from 2 to 4 carbons, or preferably a branched alkyl group having from 3 to 12 carbons, more preferably from 3 to 8 carbons, and even more preferably from 3 to 6 carbons; examples of the linear or branched alkyl group include a methyl group, an ethyl group, a propyl group, a butyl group, a pentyl group, a hexyl group, a decyl group, a dodecyl group, a tetradecyl group, an octadecyl group, an isopropyl group, an isobutyl group, a sec-butyl group, a tert-butyl group, and a 2-ethylhexyl group.

The linear or branched alkenyl group is preferably a linear alkenyl group having from 2 to 12 carbons, more preferably from 2 to 8 carbons, and even more preferably from 2 to 4 carbons, or is preferably a branched alkenyl group having from 3 to 12 carbons, more preferably from 3 to 8 carbons, and even more preferably from 3 to 6 carbons; examples of the linear or branched alkenyl group include a vinyl group, a 1-propenyl group, a 2-propenyl group, a 1-butenyl group, a 2-butenyl group, a 3-butenyl group, a 1-pentenyl group, a 2-pentenyl group, a 3-pentenyl group, a 4-pentenyl group, a 1-hexenyl group, a 3-hexenyl group, a 5-hexenyl group, a 1-heptenyl group, a 1-octenyl group, a 1-nonenyl group, a 1-decenyl group, an isopropenyl group, a 2-methyl-1-propenyl group, a methallyl group, a 3-methyl-2-butenyl group, and a 4-methyl-3-pentenyl group.

The linear or branched alkynyl group is preferably a linear alkynyl group having from 2 to 12 carbons, more preferably from 2 to 8 carbons, and even more preferably from 2 to 4 carbons, or preferably a branched alkynyl group having from 3 to 12 carbons, more preferably from 3 to 8 carbons, and even more preferably from 3 to 6 carbons; examples of the linear or branched alkynyl group include an ethynyl group, a 1-propynyl group, a 2-propynyl group, a 1-butenyl group, a 2-butenyl group, a 3-butenyl group, a 1-pentynyl group, a 2-pentynyl group, a 3-pentynyl group, a 4-pentynyl group, a 1-hexynyl group, a 2-hexynyl group, a 3-hexynyl group, a 4 hexynyl group, a 5-hexynyl group, a 1-heptynyl group, a 1-octynyl group, a 1-nonynyl group, a 1-decynyl group, a trimethylsilylethynyl group, and a triethylsilylethynyl group.

The linear or branched alkylidene group is preferably a linear alkylidene group having from 1 to 12 carbons, more preferably from 1 to 8 carbons, and even more preferably from 2 to 4 carbons, or preferably a branched alkylidene group having from 3 to 12 carbons, more preferably from 3 to 8 carbons, and even more preferably from 3 to 6 carbons; examples of the linear or branched alkylidene group include a methylidene group, a propyridene group, an isopropyridene group, a butylidene group, an isobutylidene group, a sec-butylidene group, a pentylidene group, an isopentylidene group, an octylidene group, and an isooctylidene group.

Examples of the alicyclic hydrocarbon group include a cycloalkyl group and a cycloalkenyl group.

The cycloalkyl group preferably has from 3 to 12 carbons, more preferably from 4 to 10 carbons, and even more preferably from 5 to 8 carbons; examples of the cycloalkyl group include a cyclopropyl group, a cyclobutyl group, a cyclopentyl group, a cyclohexyl group, a cycloheptyl group, a cyclooctyl group, a cyclononyl group, and a cyclodecyl group.

The cycloalkenyl group preferably has from 3 to 12 carbons, more preferably from 4 to 10 carbons, and even more preferably from 5 to 8 carbons; examples of the cycloalkenyl group include a cyclopentenyl group and a cyclohexenyl group.

The aromatic hydrocarbon group is preferably an aryl group having from 6 to 18 carbons, more preferably from 6 to 18 carbons, and even more preferably from 6 to 10 carbons; examples of the aromatic hydrocarbon group include a phenyl group and a naphthyl group.

The double line including a dashed line in Formula (1) represents a single bond or a double bond. In a case in which the double line including a dashed line is a double bond, $R^c$ is absent, and the nitrogen atom to which $R^a$ and $R^b$ in Formula (1) are bonded represents an imino group or an N-substituted imino group.

A total number of amino groups, N-substituted amino groups, or N,N-substituted amino groups that may be contained in $R^a$ to $R^c$ is preferably from 0 to 6, more preferably from 1 to 4, and even more preferably from 1 to 2.

A total number of imino groups or N-substituted imino groups that may be contained in $R^a$ to $R^c$ is preferably from 0 to 4, more preferably from 1 to 3, and even more preferably from 1 to 2.

A total number of hydroxyl groups that may be contained in $R^a$ to $R^c$ is preferably from 0 to 6, more preferably from 1 to 4, and even more preferably from 1 to 2.

The substituent included in the N-substituted amino group, the N,N-substituted amino group, or the N-substituted imino group is the same as the hydrocarbon group related to $R^a$ to $R^c$ described above.

Any two of $R^a$ to $R^c$ may bond with each other and form a ring together with the adjacent nitrogen atom. Examples of the ring formed include a pyrrolidine ring, a pyrroline ring, a piperidine ring, a pyrrole ring, an imidazolidine ring, an imidazole ring, a piperazine ring, an imidazolidine ring, a pyridine ring, a diazine ring, and a triazine ring.

The hydrocarbon group related to $R^a$ to $R^c$ may have a substituent other than an amino group, a N-substituted amino group, a N,N-substituted amino group, an imino group, a N-substituted imino group, or a hydroxyl group. Examples of such a substituent include a halogen atom (such as a fluorine atom, a chlorine atom, a bromine atom, or an iodine atom), an oxo group, a substituted oxy group (such as an alkoxy group having from 1 to 4 carbons, an aryl group having from 6 to 10 carbons, an aryloxy group having from 6 to 10 carbons, an aralkyloxy group having from 7 to 16 carbons, or an acyloxy group having from 1 to 4 carbons), a carboxyl group, a substituted oxycarbonyl group (such as an alkoxycarbonyl group having from 1 to 4 carbons, an aryloxycarbonyl group having from 6 to 10 carbons, or an aralkyloxycarbonyl group having from 7 to 16 carbons), a cyano group, a nitro group, a sulfo group, a mercapto group, and a heterocyclic group.

Specific examples of the basic compound represented by Formula (1) include: an alkylamine in which at least one of IV to R in Formula (1) is a linear or branched alkyl group; a monoalkanolamine in which $R^a$ and $R^b$ in Formula (1) are a hydrogen atom while $R^c$ is a linear or branched alkyl group having one hydroxyl group; a dialkanolamine in which $R^a$ in Formula (1) is a hydrogen atom while $R^b$ and R are the same or different and are each a linear or branched alkyl group having one hydroxyl group; a trialkanolamine in which $R^a$ to $R^c$ in Formula (1) are the same or different and are each a linear or branched alkyl group having one hydroxyl group; an aminoalkanediol in which $R^a$ and $R^b$ in Formula (1) are the same or different and are each a hydrogen atom or a linear or branched alkyl group $R^c$ is a linear or branched alkyl group having two hydroxyl groups; a diamine in which $R^a$ to $R^c$ in Formula (1) have a total of 1 amino group; a triamine in which $R^a$ to $R^c$ in Formula (1) have a total of 2 amino groups; a diaminoalkanol in which $R^a$ to $R^c$ in Formula (1) have a total of 1 amino group and a total of 1 hydroxyl group; an imidazole compound in which $R^a$ to $R^c$ in Formula (1) contain a total of 1 imino group and a ring is formed containing the nitrogen atom of the imino group; and a nitrogen-containing aromatic compound (such as a pyridine compound, a diazine compound, and a triazine compound) in which the nitrogen atom to which $R^a$ and $R^b$ in Formula (1) are bonded is an imino group and in which a ring is formed containing the imino group.

Examples of the alkylamine include methylamine, ethylamine, propylamine, butylamine, pentylamine, dimethylamine, diethylamine, dipropylamine, dibutylamine, dipentylamine, piperidine, trimethylamine, triethylamine, 4-dimethylaminopyridine, 2-aminopyrazine, 2-aminopyrimidine, 3-aminopyridazine, 2-aminotriazine, diazabicyclononene, and diazabicycloundecene.

Examples of the monoalkanolamine include 2-aminoethanol, 3-aminopropanol, 1-amino-2-propanol, 1-amino-2-methyl-2-propanol, 2-amino-2-methyl-1-propanol, 4-amino-1-butanol, 6-amino-1-hexanol, 10-amino-1-decanol, 12-amino-1-dodecanol, N-methyl-2-aminoethanol, N-ethyl-2-aminoethanol, N-propyl-2-aminoethanol, 2-dimethylaminoethanol, 6-diethylaminohexanol, 1-(2 hydroxyethyl) pyrrolidine, 2-(hydroxymethyl) pyrrolidine, 2-(2-hydroxyethyl)-1-methylpyrrolidine, 1-piperidineethanol, and 1-ethanol-4-propanolpiperidine.

Examples of the dialkanolamine include diethanolamine, di-n-propanolamine, diisopropanolamine, di-n-butanolamine, and diisobutanolamine.

Examples of the trialkanolamine include triethanolamine, tri-n-propanolamine, triisopropanolamine, tri-n-butanolamine, and triisobutanolamine.

Examples of the aminoalkanediol include 1-amino-2,3-propanediol, 4-amino-1,2-butanediol, 4-amino-1,3-butanediol, 2-amino-1,3-propanediol, 2-amino-2-methyl-1,3-propanediol, 1-methylamino-2,3-propanediol, 1-ethylamino-2,3-propanediol, 1-propylamino-2,3-propanediol, 1-butylamino-2,3-propanediol, 3-dimethylamino-1,2-propanediol, and 2-diethylamino-1,3-propanediol.

Examples of the diamine include 1,3-propanediamine, 2,2-dimethyl-1,3-propanediamine, 1,4-butanediamine, 1,5-pentanediamine, 1,6-hexanediamine, heptanediamine, 1,8-octanediamine, 1,5-diamino-2-methylpentane. N,N'-dimethylethylenediamine, N,N'-diethylethylenediamine. N,N'-dimethyl-1,3-propanediamine, N,N'-diethyl-1,3-propanediamine, N,N'-dimethyl-1,4-butanediamine, N,N'-diethyl-1,4-butanediamine, N,N'-dimethyl-1,6-hexanediamine, N,N-dimethylethylenediamine, N,N-diethylethylenediamine, N,N-dimethyl-1,3-propanediamine, N,N-diethyl-1,3-propanediamine (=diethylaminopropylamine), N,N-dimethyl-1,4-butanediamine, N,N-diethyl-1,4-butanediamine, N,N-dimethyl-1,6-hexanediamine, 1,2-cyclohexanediamine, 1,4-cyclohexanediamine, piperazine, N-methylpiperazine, N-ethylpiperazine, N,N'-dimethylpiperazine, and homopiperazine.

Examples of the triamine include diethylenetriamine, pentamethyldiethylenetriamine (=pentamethyldiethylenetriamine), N,N,N',N'',N''-pentakis(2-hydroxypropyl)diethylenetriamine, 3,3'-diaminodipropylamine, N-(3-aminopropyl)-N-methyl-1,3-propanediamine, N'-[3-(dimethylamino)propyl]-N,N-dimethyl-1,3-propanediamine, 2,6,10-trimethyl-2,6,10-triazaundecane, N-(2-aminoethyl)piperazine, 1,4,7-triazacyclononane, N,N,N',N'',N''-pentakis(2-hydroxypropyl)diethylenetriamine, 1-(2-aminoethyl)-4-methylpiperazine, and 1-(2-dimethylaminoethyl)-4-methylpiperazine.

Examples of the diaminoalkanol include 1,3-diaminopropane-2-ol, 2-(2-aminoethylamino)ethanol, 2-(2-aminopropylamino)ethanol, 2-(2 aminoethylmethylamino)ethanol, 1-(2-hydroxyethyl)piperazine, 4-methylpiperazine-1-ethanol, and 1,4-bis(2-hydroxyethyl)piperazine.

Examples of the imidazole compound include imidazole, 2-methylimidazole, 2-propylimidazole, N-methylimidazole (=1-methylimidazole), N-propylimidazole, N butylimidazole, 1-(2-hydroxyethyl)imidazole, 2-ethyl-4-methylimidazole, 1,2-dimethylimidazole, 1-benzyl-2-methylimidazole, 1-cyanoethyl-2-methylimidazole, 1-cyanoethyl-2-ethyl-4-methylimidazole, 2-phenyl-4,5-dihydroxymethylimidazole, 1-acetylimidazole, and 2-hydroxybenzimidazole.

Examples of the nitrogen-containing aromatic compound include pyridine, α-picoline, β-picoline, γ-picoline, 2,6-lutidine, 2,3-lutidine, pyrazine, 2-hydroxypyrazine, pyrimidine, 2-hydroxypyrimidine, 4-hydroxypyrimidine, pyridazine, 3-hydroxypyridazine, 4-hydroxypyridazine, triazine, and 2-hydroxytriazine.

One of these can be used alone or two or more in combination.

The basic compound may be a liquid or a solid in normal temperature and under normal pressure.

The dispersion medium according to an embodiment of the present disclosure is a mixture containing formic acid and the basic compound, and is a liquid or a solid in normal temperature and under normal pressure; however, the dispersion medium according to an embodiment of the present disclosure is preferably an organic substance that becomes a liquid when mixed with metal particles and can disperse the metal particles and turn into a paste.

A molar ratio (basic group/formic acid) of the number of moles of the basic groups related to the basic compound to the number of moles of formic acid in the dispersion medium according to an embodiment of the present disclosure is preferably from 0.50 to 1.20, more preferably from 0.55 to 1.15, and even more preferably from 0.60 to 1.10. When the molar ratio is less than 0.50, the storage stability of the electroconductive paste tends to be inferior; meanwhile, when the molar ratio exceeds 1.20, it tends to be difficult to produce a sintered body exhibiting good electroconductivity. Note that the number of moles of the basic groups related to the basic compound is the number of moles of the basic compound multiplied by the number of basic groups contained in the basic compound, and the basic groups in the imidazole compound correspond to the nitrogen atom at position 1.

For the purpose of adjusting the fluidity (viscosity) and operability, the dispersion medium according to an embodiment of the present disclosure may include: water or an organic solvent other than a mixture of formic acid and the basic compound [such as an organic acid other than formic acid (acetic acid, propionic acid, n-octanoic acid, etc.)]; an ester-based solvent such as an ester acetate (ethyl acetate, butyl acetate, etc.); an ether-based solvent such as dioxane and tetrahydrofuran; a ketone-based solvent such as acetone; an aromatic solvent such as toluene and xylene; a halogen-based solvent such as dichloromethane and chloroform; an alcohol-based solvent such as methanol, ethanol, isopropanol, and butanol; a nitrile-based solvent such as acetonitrile and benzonitrile; a resin component (for example, a polymer compound having a number average molecular weight of 10000 or greater such as ethyl cellulose resin, alkyl cellulose resin, polyvinyl acetal resin, and acrylic resin); a basic compound other than the above-mentioned basic compound [inorganic base (such as sodium hydroxide, potassium hydroxide, or ammonia), etc.]; or an additive [such as a surface conditioner (leveling agent), a defoaming agent, a dispersant, or a thixotropy-imparting agent).

The dispersion medium according to an embodiment of the present disclosure can be produced by a step of mixing and dissolving the formic acid and the basic compound in each other with another component.

The temperature at the time of mixing is preferably 100° C. or below.

The cooling after mixing may be performed in any manner as long as the mixture can be cooled to room temperature (for example, 25° C.) or below; the mixture may be gradually cooled in room temperature or rapidly cooled by ice cooling or the like.

Electroconductive Paste

The electroconductive paste according to an embodiment of the present disclosure contains metal particles and a dispersion medium including formic acid and a basic compound, and can be suitably used in the production of electronic devices (such as printed wiring boards, capacitors, inductors, varistors, thermistors, transistors, speakers, actuators, antennas, solid oxide fuel cells, and hybrid ICs) as a material for semiconductor bonding, wire bonding, clip bonding, wiring formation, bump formation, and the like.

Metal Particles

The metal particles used in an embodiment of the present disclosure may be any particles of a metal having electroconductivity after sintering, and examples thereof include particles of gold, silver, copper, nickel, palladium, tin, aluminum, or an alloy of the metals listed, or an oxide of the metals listed [such as copper oxide ($Cu_2O$, $CuO$) and silver oxide]. Among these, from the perspective of producing a sintered body having high electroconductivity, the metal particles used in an embodiment of the present disclosure is preferably at least one selected from the group consisting of copper particles, silver particles, and particles of an oxide thereof, more preferably copper particles and/or silver particles, even more preferably copper particles.

One type of these metal particles may be used alone, or two or more types of these metal particles may be used in combination.

The shape of the metal particles may be a variety of shapes, such as spherical, oval or flake-like (flat shape), or fibrous, or may be an irregular shape; however, from the perspective of coating properties and storage stability of the electroconductive paste, the shape of the metal particles is preferably spherical or flake-like. One type of these metal particles may be used alone, or two or more types of these metal particles may be used in combination.

A volume average particle size of the metal particles (median size, $D_{50}$) is preferably from 1 nm to 100 µm, more preferably from 10 nm to 50 µm, even more preferably from 30 nm to 35 µm, particularly preferably from 50 nm to 10 µm, and most preferably from 70 nm to 1 µm.

Furthermore, the metal particles may be a combination of two or more types of metal particles having different volume average particle sizes, such as: nano-sized particles having a volume average particle size of preferably 1 nm or greater and less than 300 nm, more preferably from 1 to 200 nm, and even more preferably from 1 to 150 nm; sub-nano-sized particles having a volume average particle size of preferably 0.30 µm or greater and less than 1.00 µm, more preferably from 0.40 to 0.95 µm, and even more preferably from 0.50 to 0.90 µm; and micro-sized particles having a volume average particle size of preferably from 1.0 to 100 µm, more preferably from 1.5 to 50 µm, even more preferably from 2.0 to 35 µm, particularly preferably from 2.5 to 10 µm, and most preferably from 3.0 to 10 µm. The volume average particle size of the metal particles can be measured, for example, using a commercially available laser diffraction particle size analyzer (such as SALD-7000, available from Shimadzu Corporation).

When metal particles of different volume average particle sizes are used in combination, a weight ratio of the nano-sized particles to the total metal particles (nano-sized particles/total metal particles) is preferably from 0.10 to 0.90, more preferably from 0.15 to 0.85, and even more preferably from 0.20 to 0.80.

Also, when two or more types of metal particles are used in combination, a weight ratio of copper particles to the total metal particles (copper particles/total metal particles) is preferably from 0.35 to 0.90, more preferably from 0.40 to 0.87, and even more preferably from 0.45 to 0.84.

The content of the metal particles in the electroconductive paste according to an embodiment of the present disclosure (or the sum when metal particles of two or more metals and/or two or more volume average particle sizes are contained) is preferably from 70 to 99 wt. %, more preferably from 72 to 95 wt. %, even more preferably from 74 to 93 wt. %, particularly preferably from 76 to 95 wt. %, most preferably from 78 to 93 wt. %.

From the perspective of the ease of producing a sintered body exhibiting good electroconductivity, the electroconductive paste according to an embodiment of the present disclosure preferably has a content of formic acid, a content of the basic compound, and a weight ratio (basic compound/formic acid) satisfying the following ranges at the same time. The content of formic acid is preferably from 4.0 to 8.9 wt %, more preferably from 4.3 to 8.0 wt %, even more preferably from 4.5 to 7.5 wt. %, while the content of the basic compound (or the total content when two or more types are used in combination) is preferably from 6.5 to 12.0 wt. %, more preferably from 6.6 to 11.8 wt. %, and even more preferably from 6.7 to 11.5 wt. %, while the weight ratio (basic compound/formic acid) of the basic compound to formic acid is preferably from 0.70 to 3.50, more preferably from 0.72 to 3.40, and even more preferably from 0.74 to 3.30.

From the perspective of improving coating accuracy by suppressing the dripping or flowing of the electroconductive paste coated, and from the perspective of the ability to stably maintain the uniformly dispersed state of metal particles, a viscosity (25° C., a shear rate of 10 $s^{-1}$) of the electroconductive paste according to an embodiment of the present disclosure measured by a rheometer immediately after mixing the dispersion medium and the metal particles is preferably from 10 to 1000 Pa·s, more preferably from 50 to 900 Pa·s, and even more preferably from 100 to 800 Pa·s.

The electroconductive paste according to an embodiment of the present disclosure exhibits excellent storage stability at, for example, from −50° C. to 30° C. A viscosity (25° C., a shear rate of 10 $s^4$) of the electroconductive paste measured by a rheometer after storage for 7 days or more, usually 35 days or less, at 25° C. or lower (such as 25° C. or 5° C.) is preferably from 4 to 10000 Pa·s, more preferably from 20 to 4500 Pa·s, even more preferably from 50 to 2400 Pa·s. Note that the viscosity can be measured by a method described in the Examples.

A viscosity ratio (viscosity after storage/viscosity immediately after mixing) is preferably 10.0 or less, more preferably from 0.4 to 5.0, and even more preferably from 0.5 to 3.0. The viscosity after storage is a viscosity (25° C., a shear rate of 10 $s^{-1}$) of the electroconductive paste according to an embodiment of the present disclosure measured by a rheometer after storage for 7 days at 25° C. or lower (such as 25° C. or 5° C.). The viscosity immediately after mixing is the viscosity (25° C., a shear rate of 10 $s^{-1}$) of the electroconductive paste measured by a rheometer immediately after mixing the dispersion medium and the metal particles.

The reason why storage stability can be increased to excellent level by blending the basic compound is unclear, but it can be inferred that it is because the basic compound stabilizes formic acid and prevents formic acid from reacting with metal particles and forming aggregates.

The maximum peak temperature in a derivative thermogravimetry (DTG), which is the temperature at which the slope of weight reduction is the largest in a thermal thermogravimetry TG (in a nitrogen atmosphere with a temperature increase rate of 10° C./min), of the electroconductive paste according to an embodiment of the present disclosure is preferably from 100 to 220° C., more preferably from 110 to 210° C., and even more preferably from 120 to 200° C. When the peak temperature falls below 100° C., formic acid tends to volatilize too quickly and the reduction of metal particles tends to be insufficient; meanwhile, when the peak temperature exceeds 220° C., the entire dispersion medium tends to remain, hindering low-temperature firing.

The electroconductive paste according to an embodiment of the present disclosure can be produced via a step of mixing the metal particles and the dispersion medium. Further, the electroconductive paste according to an embodiment of the present disclosure can be produced via a step of mixing the metal particles with the formic acid, basic compound, and another component.

The temperature at the time of mixing is preferably 100° C. or below.

The cooling after mixing may be performed in any manner as long as the mixture can be cooled to room temperature (for example, 25° C.) or below; the mixture may be gradually cooled in room temperature or rapidly cooled by ice cooling or the like.

The total content of water, an organic solvent other than the mixture of formic acid and the basic compound, a basic compound other than the above-mentioned basic compound, an additive, and the like in the electroconductive paste according to an embodiment of the present disclosure is preferably 10 wt. % or less.

Since the electroconductive paste according to an embodiment of the present disclosure has an appropriate viscosity as described above, it is not necessary to add a resin component. Even in a case in which a resin component is added, a content of the resin component in the electroconductive paste is preferably 10 wt. % or less, more preferably 5 wt. % or less. When the amount of the resin component added exceeds the above range, the ash content derived from the resin component generated by firing causes deterioration of the electrical properties, which is not preferable.

The mixture of formic acid and the basic compound contained in the electroconductive paste according to an embodiment of the present disclosure rapidly volatilizes during firing; further, formic acid reduces the surface oxidation of the metal particle. As such, low-temperature firing of the electroconductive paste (preferably from 120 to 320° C., more preferably from 150 to 290° C., and even more preferably from 180 to 260° C.) becomes possible even when not in a reducing atmosphere.

Since the electroconductive paste according to an embodiment of the present disclosure combines the above properties, the electroconductive paste can be discharged well to the surface of a substrate (such as a ceramic substrate or a green sheet) by a method such as screen printing and can make the edge of the drawing part more clearly defined to improve printing precision. In addition, the electroconductive paste according to an embodiment of the present disclosure can prevent the precipitation or local aggregation of metal particles, and can be discharged and printed while stably maintaining a uniformly and highly dispersed state; by drying and firing the discharged electroconductive paste, wiring or the like having excellent electroconductivity can be formed with good precision.

In addition, the electroconductive paste according to an embodiment of the present disclosure can be discharged selectively to a desired position on the surface of a substrate provided with an electrode, a circuit, or the like by a method such as screen printing; then, by bonding an electronic component or the like to the substrate and performing firing, the substrate and the electronic component can be electrically connected. Furthermore, the compound according to an embodiment of the present disclosure can be fired at a low temperature, thus component implementation can be performed at a lower temperature than component implementation employing soldering. Thus, the compound of the present disclosure can be used for implementation of an electronic component and the like having poor heat resistance.

Thus, the electroconductive paste according to an embodiment of the present disclosure is particularly useful in producing, for example, printed wiring boards such as multilayer printed wiring boards, capacitors such as multilayer ceramic capacitors, inductors, varistors, thermistors, transistors, speakers, actuators, antennas, solid oxide fuel cells (SOFCs), and hybrid ICs, particularly multilayer ceramic capacitors.

Note that each of the configurations, combinations thereof, and the like in each of the embodiments are an example, and various additions, omissions, substitutions, and other changes may be made as appropriate without departing from the spirit of the present disclosure. The present disclosure is not limited by the embodiments and is limited only by the claims.

EXAMPLES

Hereinafter, the present disclosure will be described in more detail based on examples, but the present disclosure is not limited by these examples at all.

Hereinafter, the volume average particle size (median size, $D_{50}$) of the metal particles is a value measured by a laser diffraction/scattering method unless otherwise specified.

The metal particles (copper particles, silver particles, copper oxide), solvents (formic acid, basic compound, organic solvent, organic acid other than formic acid), and additive used are as follows.

Copper Particles
  TNCu: Volume average particle size is 110 nm (calculated by SEM observation method), available from Taiyo Nippon Sanso Corporation
  1200YP: Volume average particle size is 3.1 µm, available from Mitsui Mining & Smelting Co., Ltd.
  CT-0500: Volume average particle size is 0.74 µm, available from Mitsui Mining & Smelting Co., Ltd.
  1050Y, Volume average particle size is 0.81 µm, available from Mitsui Mining & Smelting Co., Ltd.

Silver Particles
  S211A-10: Volume average particle size is 0.54 µm, available from Daiken Chemical Co., Ltd.

Copper Oxide
  $Cu_2O$: Copper (I) oxide 99.5%, available from FUJIFILM Wako Pure Chemical Corporation
  CuO: Copper (II) oxide powder, available from FUJIFILM Wako Pure Chemical Corporation Formic Acid
  Formic acid 88% aqueous solution: Available from FUJIFILM Wako Pure Chemical Corporation
  Formic acid/triethylamine (5:2 molar ratio azeotropic composition): Available from Tokyo Chemical Industry Co., Ltd.

Basic Compound
  Triethanolamine: A reagent available from Tokyo Chemical Industry Co., Ltd.
  1-Methylimidazole: A reagent available from Tokyo Chemical Industry Co., Ltd.
  Pentamethyldiethylenetriamine: A reagent available from Tokyo Chemical Industry Co., Ltd.
  N-ethyldiethanolamine: A reagent available from Tokyo Chemical Industry Co., Ltd.
  Diethanolamine: A reagent available from Tokyo Chemical Industry Co., Ltd.
  Diethylaminopropylamine: A reagent available from Tokyo Chemical Industry Co., Ltd.
  N,N'-dimethylpiperazine: A reagent available from Tokyo Chemical Industry Co., Ltd.
  1-(2-Dimethylaminoethyl)-4-methylpiperazine: A reagent available from Tokyo Chemical Industry Co., Ltd.

Organic Solvent
  Triethylene glycol: A reagent available from Tokyo Chemical Industry Co., Ltd.
Organic Acid Other than Formic Acid
  Acetic acid: A reagent available from FUJIFILM Wako Pure Chemical Corporation
  n-Octanoic acid: A reagent available from Tokyo Chemical Industry Co., Ltd.
Additive
  BYK-067A: A silicone-based defoaming agent, available from BYK Additives & Instruments
Peak Temperature at which the Slope of Weight Reduction is the Largest (DTG Maximum Peak Temperature)
  A TG curve was determined from thermogravimetry by measuring using a thermogravimetric analyzer (TG-DSC STA200 available from Hitachi High-Tech Science Corporation) under a nitrogen atmosphere (at a flow rate of 200 mL/min) and a temperature increase rate of 10° C./min; the determined TG curve was differentiated to give a derivative thermogravimetric (DTG) curve, and the peak in the negative direction with the maximum value was defined as the DTG maximum peak.
Storage Stability Evaluation
  The storage stability evaluation of the electroconductive paste was performed as follows. A storage stability evaluation sample stored in the air at room temperature (25° C.) or 5° C. for 1 or 2 weeks was investigated using a rheometer (MCR302, available from Anton Paar GmbH) with a measuring jig of PP12 at a gap of 0.05 mm and at 25° C.; the shear rate was varied in a log scale from 0.001 to 100 s$^{-1}$, based on which a viscosity curve was plotted. From the determined viscosity curve, the initial viscosity (B0) immediately after blending at a shear rate of 10 s$^{-1}$, the viscosity (B1) after storage at 25° C. for 1 week, the viscosity (B2) after storage at 25° C. for 2 weeks, the viscosity (B3) after storage at 5° C. for 1 week, and the viscosity (B4) after storage at 5° C. for 2 weeks were calculated and compared.

Example 1

A formic acid/triethylamine mixed solvent (5:2 molar ratio azeotropic composition), triethanolamine, and TNCu were blended to give the contents described in Table 1, and a planetary centrifugal mixer (THINKY MIXER, available from THINKY CORPORATION) was used to stir the mixture for 5 minutes, resulting in a paste. The molar ratio of basic groups to formic acid (basic group/formic acid) was 0.96. The DTG maximum peak temperature was 130° C. Regarding the viscosities B1 to B4 after storage of the paste of Example 1, the viscosity ratios B1/B0, B2/B0, B3/B0, and B4/B0 were all less than 1, indicating good storage stability.

Comparative Example 1

A paste was prepared in the same manner as in Example 1 in accordance with the blending ratio described in Table 1 which did not include triethanolamine. The paste of Comparative Example 1 exhibited inferior storage stability because aggregates were formed inside the paste during storage, making it difficult to measure the viscosity. The DTG maximum peak temperature was 123° C.

Example 2

A formic acid 88% aqueous solution, 1-methylimidazole, and TNCu were mixed to give the contents described in Table 1, and a paste was prepared in the same manner as in Example 1. The molar ratio of basic groups to formic acid was 0.61. The DTG maximum peak temperature was 135° C. Regarding the viscosities B1 to B4 after storage of the paste of Example 2, the viscosity ratios B1/B0, B2/B0, and B4/B0 were less than 1 while B3/B0 was 1.09, indicating good storage stability.

Comparative Example 2

A paste was prepared in the same manner as in Example 1 in accordance with the blending ratio described in Table 1 which, compared to the blending ratio of Example 2, excluded 1-methylimidazole. The molar ratio of basic groups to formic acid was 0.40. Same as the paste of Comparative Example 1, the paste of Comparative Example 2 exhibited inferior storage stability because aggregates were formed inside the paste during storage, making it difficult to measure the viscosity. The DTG maximum peak temperature was 117° C.

TABLE 1

| | | (wt. %) | Examples | | Comparative Examples | |
|---|---|---|---|---|---|---|
| | | | 1 | 2 | 1 | 2 |
| Copper Particles | | TNCu | 80.0 | 83.4 | 80.0 | 83.3 |
| Solvent | | Formic Acid | 5.4 | 7.5 | 10.6 | 9.0 |
| | Basic Compound | Triethanolamine | 10.0 | 0 | 0 | 0 |
| | | 1-Methylimidazole | 0 | 8.1 | 0 | 6.4 |
| | | Pentamethyldiethylenetriamine | 0 | 0 | 0 | 0 |
| | | Triethylamine | 4.6 | 0 | 9.4 | 0 |
| | Other | Water | 0 | 1.0 | 0 | 1.3 |
| Molar Ratio (Basic Group/Formic Acid) | | | 0.96 | 0.61 | 0.40 | 0.40 |
| DTG Maximum Peak Temperature | | | 130 | 135 | 123 | 117 |
| Viscosity | | B0 | 239 | 394 | 66 | 403 |
| | | B1 | 146 | 258 | Unmeasurable | Unmeasurable |
| | | B2 | 134 | 382 | Unmeasurable | Unmeasurable |
| | | B1/B0 | 0.61 | 0.65 | — | — |
| | | B2/B0 | 0.56 | 0.97 | — | — |
| | | B3 | 163 | 430 | Unmeasurable | Unmeasurable |
| | | B4 | 141 | 297 | Unmeasurable | Unmeasurable |
| | | B3/B0 | 0.68 | 1.09 | — | — |
| | | B4/B0 | 0.59 | 0.75 | — | — |

Electroconductivity Evaluation

The electroconductivity evaluation of the electroconductive paste was performed as follows. A piece of slide glass with the four sides masked with a masking tape (polyester film adhesive tape 631U #12, available from Teraoka Seisakusho Co., Ltd.) was coated with the electroconductive paste using a squeegee, forming a film of electroconductive paste having a thickness of 25 μm. The piece was then subjected to sintering at the sintering temperature and sintering time described in Table 2 in a nitrogen atmosphere using a sintering furnace (RSS-450-210-FA, available from UNITEMP), resulting in a sample for electroconductivity evaluation. The volume resistivity of the sample was measured using a resistivity meter (Loresta GP MCP-T610, available from Mitsubishi Chemical Analytech Co., Ltd.).

Examples 1 and 2

Both the pastes of Example 1 and Example 2 had a low volume efficiency of 100 μΩ·cm or less, indicating good electroconductivity. The paste of Example 2 exhibited good electroconductivity even with a low-temperature sintering of 200° C.

Examples 3 and 4

A formic acid 88% aqueous solution, triethanolamine, and TNCu were blended to give the contents described in Table 2, and pastes were prepared in the same manner as in Example 1. The molar ratios of basic groups to formic acid were 1.00 and 0.60 for each of the pastes. The DTG maximum peak temperatures were 192° C. and 132° C. for each of the pastes. The pastes of Examples 3 and 4 both exhibited good electroconductivity.

Examples 5 to 7

A formic acid 88% aqueous solution, pentadiethylenetriamine which is a polyfunctional amine, and TNCu were blended to give the contents described in Table 2, and pastes were produced in the same manner as in Example 1; the pastes also exhibited good electroconductivity.

Example 8

A formic acid 88% aqueous solution, diethanolamine, and TNCu were blended to give the contents described in Table 2, and a paste was produced in the same manner as in Example 1; the paste also exhibited good electroconductivity. The DTG maximum peak temperature was 133° C.

Example 9

A formic acid 88% aqueous solution, diethylaminopropylamine, and TNCu were blended to give the contents described in Table 2, and a paste was produced in the same manner as in Example 1; the paste also exhibited good electroconductivity. The DTG maximum peak temperature was 129° C.

Examples 10 to 13

A formic acid 88% aqueous solution, a combination of two basic compounds, namely 1-methylimidazole and N-ethyldiethanolamine, and TNCu were blended in accordance with the ratios described in Table 2, and pastes were produced in the same manner as in Example 1; the pastes also exhibited good electroconductivity. The DTG maximum peak temperature in Example 10 was 131° C.

Comparative Example 3

A formic acid 88% aqueous solution, a combination of two basic compounds, namely 1-methylimidazole and N-ethyldiethanolamine, and TNCu were blended in accordance with the ratios described in Table 2 to give a molar ratio of base to formic acid of 1.31, and a paste was prepared in the same manner as in Example 1. The volume resistivity of the paste of Comparative Example 3 was 377μω·cm, indicating inferior electroconductivity. The DTG maximum peak temperature was 136° C.

TABLE 2

| | (wt. %) | | Examples | | | | | | |
|---|---|---|---|---|---|---|---|---|---|
| | | | 1 | 2 | 3 | 4 | 5 | 6 | 7 |
| Copper Particles | | TNCu | 80.0 | 83.4 | 80.0 | 80.0 | 83.3 | 83.3 | 83.3 |
| Solvent | | FormicAcid | 5.4 | 7.5 | 4.6 | 6.5 | 7.0 | 7.8 | 8.8 |
| | Basic Compound | Triethanolamine | 10.0 | 0 | 14.8 | 12.6 | 0 | 0 | 0 |
| | | 1-Methylimidazole | 0 | 8.1 | 0 | 0 | 0 | 0 | 0 |
| | | Pentamethyldiethylenetriamine | 0 | 0 | 0 | 0 | 8.8 | 7.8 | 6.7 |
| | | N-ethyldiethanolamine | 0 | 0 | 0 | 0 | 0 | 0 | 0 |
| | | Diethanolamine | 0 | 0 | 0 | 0 | 0 | 0 | 0 |
| | | Diethylaminopropylamine | 0 | 0 | 0 | 0 | 0 | 0 | 0 |
| | | Triethylamine | 4.6 | 0 | 0 | 0 | 0 | 0 | 0 |
| | Other | Triethylene Glycol | 0 | 0 | 0 | 0 | 0 | 0 | 0 |
| | | Water | 0 | 1.0 | 0.6 | 0.9 | 0.9 | 1.1 | 1.2 |
| Molar Ratio (Basic Group/Formic Acid) | | | 0.96 | 0.61 | 1.00 | 0.60 | 1.00 | 0.81 | 0.60 |
| DTG Maximum Peak Temperature | | | 130 | 135 | 192 | 132 | 116 | — | — |
| Sintering Conditions | | Temperature(°C.) | 300 250 | 300 250 200 | 300 250 200 | 300 250 200 | 300 250 200 | 250 | 250 |
| | | Time (min) | 60 60 | 60 60 60 | 60 60 60 | 60 60 60 | 60 60 60 | 5 | 5 |
| Volume Resistivity μΩ · cm | | | 27 31 | 4 4 12 | 15 12 18 | 14 14 26 | 10 14 20 | 16 | 4 |

| | (wt. %) | | Examples | | | | | | Comparative Examples |
|---|---|---|---|---|---|---|---|---|---|
| | | | 8 | 9 | 10 | 11 | 12 | 13 | 3 |
| Copper Particles | | TNCu | 80.0 | 80.0 | 83.4 | 83.3 | 83.3 | 83.4 | 83.3 |

TABLE 2-continued

| | | | | | | | | |
|---|---|---|---|---|---|---|---|---|
| Solvent | | FormicAcid | 5.8 | 7.8 | 4.8 | 4.6 | 5.0 | 6.4 | 3.8 |
| Basic Compound | | Triethanolamine | 0 | 0 | 0 | 0 | 0 | 0 | 0 |
| | | 1-Methylimidazole | 0 | 0 | 4.3 | 3.3 | 5.3 | 5.7 | 3.4 |
| | | Pentamethyldiethylenetriamine | 0 | 0 | 0 | 0 | 0 | 0 | 0 |
| | | N-ethyldiethanolamine | 0 | 0 | 6.9 | 8.1 | 5.7 | 3.7 | 8.9 |
| | | Diethanolamine | 13.4 | 0 | 0 | 0 | 0 | 0 | 0 |
| | | Diethylaminopropylamine | 0 | 11.1 | 0 | 0 | 0 | 0 | 0 |
| | | Triethylamine | 0 | 0 | 0 | 0 | 0 | 0 | 0 |
| Other | | Triethylene Glycol | 0 | 0 | 0 | 0 | 0 | 0 | 0 |
| | | Water | 0.8 | 1.1 | 0.6 | 0.7 | 0.7 | 0.8 | 0.6 |
| Molar Ratio (Basic Group/Formic Acid) | | | 1.00 | 1.00 | 1.00 | 1.02 | 0.99 | 0.70 | 1.31 |
| DTG Maximum Peak Temperature | | | 133 | 129 | 131 | — | — | — | 136 |
| Sintering Conditions | | Temperature(°C.) | 250 | 250 | 250 | 250 | 250 | 250 | 250 |
| | | Time (min) | 5 | 5 | 5 | 5 | 5 | 5 | 5 |
| Volume Resistivity μΩ · cm | | | 36 | 17 | 8 | 32 | 14 | 4 | 377 |

Regarding the DTG maximum peak temperatures in Table 2, those marked with "-" indicates that no measurement has been performed.

Example 14

Formic acid, n-octanoic acid, pentamethyldiethylenetriamine, and TNCu were blended to give the contents described in Table 3, and a paste was prepared in the same manner as in Example 1. The volume resistivity of the paste of Example 14 was 11 μΩ·cm, indicating good electroconductivity.

Example 15

Formic acid, pentamethyldiethylenetriamine, triethylene glycol which is another organic solvent, and TNCu were blended to give the contents described in Table 3, and a paste was produced in the same manner as in Example 1; the paste also exhibited good electroconductivity.

Comparative Example 4

1-Methylimidazole, diethanolethylamine, and TNCu were blended without formic acid to give the contents described in Table 3, and a paste was prepared in the same manner as in Example 1. The volume resistivity of the paste of Comparative Example 4 was 6020 μΩ·cm, which was very large, indicating significantly inferior electroconductivity, unlike that of Example 13 (Table 2).

Comparative Examples 5 and 6

Acetic acid or n-octanoic acid, which are organic acids other than formic acid, pentamethyldiethylenetriamine, and TNCu were blended to give the contents described in Table 3, and pastes were prepared in the same manner as in Example 1. The paste samples of Comparative Examples 5 and 6 did not exhibit electroconductivity.

TABLE 3

| | | | Examples | | Comparative Examples | | |
|---|---|---|---|---|---|---|---|
| (wt. %) | | | 14 | 15 | 4 | 5 | 6 |
| Copper Particles | | TNCu | 80.0 | 83.3 | 83.3 | 80.0 | 80.0 |
| Solvent | Organic Acid | Formic Acid | 5.5 | 5.7 | 0 | 0 | 0 |
| | | Acetic Acid | 0 | 0 | 0 | 10.2 | 0 |
| | | n-Octanoic Acid | 6.9 | 0 | 0 | 0 | 14.2 |
| | Basic Compound | 1-Methylimidazole | 0 | 0 | 6.3 | 0 | 0 |
| | | Pentamethyldiethylenetriamine | 6.9 | 7.1 | 0 | 9.8 | 5.8 |
| | | N-ethyldiethanolamine | 0 | 0 | 10.4 | 0 | 0 |
| | Other | Triethylene Glycol | 0 | 3.2 | 0 | 0 | 0 |
| | | Water | 0.7 | 0.7 | 0 | 0 | 0 |
| Molar Ratio (Basic Group/Formic Acid) | | | 1.00 | 1.00 | — | — | — |
| Sintering Conditions | | Temperature (° C.) | 250 | 250 | 250 | 250 | 250 |
| | | Time (min) | 5 | 5 | 5 | 5 | 5 |
| Volume Resistivity μΩ · cm | | | 11 | 21 | 6020 | Unmeasurable | Unmeasurable |

Example 16

A paste was prepared in the same manner as in Example 2 (TNCu used: copper nanoparticles having an average particle size of 110 nm) except that 1200 YP (copper flake particles having an average particle size 3.1 μm) was used as the metal particles. The volume resistivity of the paste of Example 16 was 46μΩ·cm, indicating good electroconductivity as with the paste of Example 2.

Examples 17 and 18

Pa·stes were prepared in the same manner as in Example 2 except that CT-0500 (copper sub-micro particles having an average particle size of 0.74 μm) or 1050Y (copper sub-micro particles having an average particle size of 0.81 μm) was used as the metal particles. The volume resistivity of the pastes of Example 17 was 84 μΩ·cm and the volume resistivity of the paste of Example 18 was 64 μΩ·cm, indicating good electroconductivity as with the paste of Example 2.

Examples 19 to 35

Pa·stes were produced in the same manner as in Example 2 except that the metal particles used were a mixture of TNCu and 1200YP, or TNCu and CT-0500, or TNCu and 1050Y blended to give the contents described in Table 4; all the pastes exhibited good electroconductivity.

Example 36

A paste was produced in the same manner as in Example 7 except that the metal particles used were a mixture of TNCu and S211A-10 (silver sub-micro particles having an average particle size of 0.54 μm) blended to give the contents described in Table 4; the paste exhibited good electroconductivity.

Examples 37 and 38

Pastes were produced in the same manner as in Example 2 except that the metal particles used were a mixture of TNCu and cuprous oxide ($Cu_2O$) or a mixture of TNCu and cupric oxide (CuO), cuprous oxide and cupric oxide being metal compounds, blended to give the contents described in Table 4; both pastes exhibited good electroconductivity.

TABLE 4

| | (wt. %) | | Examples 16 | 17 | 18 | 19 | 20 | 21 | 22 | 23 | 24 | 25 | 26 | 27 |
|---|---|---|---|---|---|---|---|---|---|---|---|---|---|---|
| Metal Particles | Copper Particles | TNCu | 0 | 0 | 0 | 40.0 | 41.7 | 41.7 | 62.6 | 62.5 | 20.8 | 20.8 | 62.6 | 62.5 |
| | | 1200 YP | 83.4 | 0 | 0 | 40.0 | 0 | 0 | 0 | 0 | 0 | 0 | 20.8 | 20.8 |
| | | CT-500 | 0 | 83.4 | 0 | 0 | 41.7 | 41.7 | 20.8 | 20.8 | 62.6 | 62.5 | 0 | 0 |
| | | 1050Y | 0 | 0 | 83.4 | 0 | 0 | 0 | 0 | 0 | 0 | 0 | 0 | 0 |
| | Silver Particles | S211A-10 | 0 | 0 | 0 | 0 | 0 | 0 | 0 | 0 | 0 | 0 | 0 | 0 |
| | Copper Oxide | $Cu_2O$ | 0 | 0 | 0 | 0 | 0 | 0 | 0 | 0 | 0 | 0 | 0 | 0 |
| | | CuO | 0 | 0 | 0 | 0 | 0 | 0 | 0 | 0 | 0 | 0 | 0 | 0 |
| | Weight Ratio (TNCu/Total Metal Particles) | | — | — | — | 0.50 | 0.50 | 0.50 | 0.75 | 0.75 | 0.25 | 0.25 | 0.75 | 0.75 |
| Solvent | Formic Acid | | 7.5 | 7.5 | 7.5 | 5.4 | 7.5 | 7.0 | 7.5 | 7.0 | 7.5 | 7.0 | 7.5 | 7.0 |
| | Basic Compound | Triethanolamine | 0 | 0 | 0 | 10.0 | 0 | 0 | 0 | 0 | 0 | 0 | 0 | 0 |
| | | 1-Methylimidazole | 8.1 | 8.1 | 8.1 | 0 | 8.1 | 0 | 8.1 | 0 | 8.1 | 0 | 8.1 | 0 |
| | | Pentamethyldiethylenetriamine | 0 | 0 | 0 | 0 | 0 | 8.8 | 0 | 8.8 | 0 | 8.8 | 0 | 8.8 |
| | | N,N'-dimethylpiperazine | 0 | 0 | 0 | 0 | 0 | 0 | 0 | 0 | 0 | 0 | 0 | 0 |
| | | 1-(2-Dimethylaminoethyl)-4-methylpiperazine | 0 | 0 | 0 | 0 | 0 | 0 | 0 | 0 | 0 | 0 | 0 | 0 |
| | | Triethylamine | 0 | 0 | 0 | 4.6 | 0 | 0 | 0 | 0 | 0 | 0 | 0 | 0 |
| | Other | Water | 1.0 | 1.0 | 1.0 | 0 | 1.0 | 0.8 | 1.0 | 0.9 | 1.0 | 0.9 | 1.0 | 0.9 |
| | Molar Ratio (Basic Group/Formic Acid) | | 0.61 | 0.61 | 0.61 | 0.96 | 0.61 | 1.00 | 0.61 | 1.00 | 0.61 | 1.00 | 0.61 | 1.00 |
| Sintering Conditions | Temperature (° C.) | | 250 | 250 | 250 | 300 | 250 | 250 | 250 | 250 | 250 | 250 | 250 | 250 |
| | Time (min) | | 5 | 5 | 5 | 60 | 60 | 5 | 5 | 5 | 5 | 5 | 5 | 5 |
| | Volume Resistivity μΩ·cm | | 46 | 84 | 60 | 24 | 25 | 22 | 20 | 18 | 10 | 32 | 26 | 6 | 6 |

| | (wt. %) | | Examples 28 | 29 | 30 | 31 | 32 | 33 | 34 | 35 | 36 | 37 | 38 |
|---|---|---|---|---|---|---|---|---|---|---|---|---|---|
| Metal Particles | Copper Particles | TNCu | 41.7 | 41.7 | 62.4 | 62.4 | 62.5 | 62.5 | 62.5 | 62.5 | 41.7 | 66.7 | 66.7 |
| | | 1200 YP | 41.7 | 41.7 | 20.8 | 0 | 20.8 | 0 | 20.8 | 0 | 0 | 0 | 0 |
| | | CT-500 | 0 | 0 | 0 | 0 | 0 | 0 | 0 | 0 | 0 | 0 | 0 |
| | | 1050Y | 0 | 0 | 0 | 20.8 | 0 | 20.8 | 0 | 20.8 | 0 | 0 | 0 |
| | Silver Particles | S211A-10 | 0 | 0 | 0 | 0 | 0 | 0 | 0 | 0 | 41.7 | 0 | 0 |

TABLE 4-continued

| | | | | | | | | | | | | | |
|---|---|---|---|---|---|---|---|---|---|---|---|---|---|
| | Copper Oxide | $Cu_2O$ | 0 | 0 | 0 | 0 | 0 | 0 | 0 | 0 | 0 | 16.7 | 0 |
| | | CuO | 0 | 0 | 0 | 0 | 0 | 0 | 0 | 0 | 0 | 0 | 16.7 |
| | Weight Ratio (TNCu/Total Metal Particles) | | 0.50 | 0.50 | 0.75 | 0.75 | 0.75 | 0.75 | 0.75 | 0.75 | 0.50 | 0.80 | 0.80 |
| Solvent | Formic Acid | | 7.5 | 7.0 | 7.1 | 7.1 | 7.1 | 7.1 | 7.1 | 7.1 | 7.0 | 7.5 | 7.5 |
| | Basic Compound | Triethanolamine | 0 | 0 | 0 | 0 | 0 | 0 | 0 | 0 | 0 | 0 | 0 |
| | | 1-Methylimidazole | 8.1 | 0 | 5.1 | 5.1 | 5.1 | 5.1 | 5.1 | 5.1 | 0 | 8.1 | 8.1 |
| | | Pentamethyldiethylenetriamine | 0 | 8.8 | 3.6 | 3.6 | 0 | 0 | 0 | 0 | 8.8 | 0 | 0 |
| | | N,N'-dimethylpiperazine | 0 | 0 | 0 | 0 | 3.5 | 3.5 | 0 | 0 | 0 | 0 | 0 |
| | | 1-(2-Dimethylaminoethyl)-4-methylpiperazine | 0 | 0 | 0 | 0 | 0 | 0 | 3.5 | 3.5 | 0 | 0 | 0 |
| | | Triethylamine | 0 | 0 | 0 | 0 | 0 | 0 | 0 | 0 | 0 | 0 | 0 |
| | Other | Water | 1.0 | 0.8 | 1.0 | 1.0 | 1.0 | 1.0 | 1.0 | 1.0 | 0.8 | 1.0 | 1.0 |
| | Molar Ratio (Basic Group/Formic Acid) | | 0.61 | 1.00 | 0.80 | 0.80 | 0.80 | 0.80 | 0.80 | 0.80 | 1.00 | 0.61 | 0.61 |
| Sintering Conditions | Temperature (° C.) | | 250 | 250 | 250 | 250 | 250 | 250 | 250 | 250 | 250 | 250 | 250 |
| | Time (min) | | 5 | 5 | 5 | 5 | 5 | 5 | 5 | 5 | 5 | 5 | 5 |
| Volume Resistivity $\mu\Omega \cdot cm$ | | | 6 | 36 | 10 | 14 | 6 | 8 | 6 | 12 | 30 | 20 | 64 |

Bonding Performance Evaluation

The bonding performance evaluation was performed on the pastes of Examples 1, 5, 13, and 15, as well as Example 39 having the same composition as in Example 5 but with BYTE-067A further blended as an additive.

The evaluation of the bonding performance of the electroconductive paste was performed as follows. A copper substrate (oxygen-free copper plate, 14 mm×9 mm×1 mm, available from Asahi Seisakusho Co., Ltd.) was coated with the electroconductive paste using a metal mask printing method (metal mask: 4 mm×4 mm, mesh thickness: 100 μm, available from Towa-Tec Cooperation), forming a coating film (coating film thickness: approximately 100 μm). A copper dummy chip (oxygen-free copper plate, 14 mm×9 mm×1 mm, available from Asahi Seisakusho Co., Ltd.) was placed on the coating film; in the same manner as in WO2018/029983, the article was placed in a nitrogen atmosphere, and the temperature was raised from the room temperature of 25° C. to 300° C., 250° C., 200° C. or 180° C. at a temperature increase rate of 20° C./min while pressure was being applied. Then, heating was further performed for 30 min, resulting in a bonding performance evaluation sample (copper substrate/sintered electroconductive paste/copper dummy chip). The bonding strength of the sample was measured using a die shear tester (SERIES 4000, available from DAGE) at a test speed of 50 μm/s and a test height of 50 μm in room temperature.

In all of Examples 1, 5, 13, 15, and 39, the bonding strength exceeded 20 MPa, indicating good bonding performance. This indicates that an electroconductive paste containing formic acid and a base can be applied to bonding. Furthermore, in Examples 5 and 39, even at extremely low sintering temperatures such as 200° C. and 180° C., the bonding strength exceeded 20 MPa, indicating good bonding performance. Further, in Example 39, by blending an additive such as BYK-067A, the bonding strength exceeded 20 MPa even when firing at an extremely low pressure such as 0.05 MPa or no pressure, indicating good bonding performance.

TABLE 5

| (wt. %) | | | Example 1 | Example 5 | Example 13 | Example 15 | Example 39 |
|---|---|---|---|---|---|---|---|
| Copper Particles | TNCu | | 80.0 | 83.3 | 83.3 | 83.3 | 83.1 |
| Solvent | Formic Acid | | 5.4 | 7.0 | 4.6 | 5.7 | 7.0 |
| | Basic Compound | Triethanolamine | 10.0 | 0 | 0 | 0 | 0 |
| | | 1-Methylimidazole | 0 | 0 | 0 | 3.3 | 0 |

TABLE 5-continued

| (wt. %) | | Example 1 | Example 5 | | | | Example 13 | Example 15 | Example 39 | | | | | | |
|---|---|---|---|---|---|---|---|---|---|---|---|---|---|---|---|
| | Pentamethyl-diethylenetriamine | 0 | 8.8 | | | | 0 | 7.1 | 8.7 | | | | | | |
| | N-ethyldiethanolamine | 0 | 0 | | | | 8.1 | 0 | 0 | | | | | | |
| | Triethylamine | 4.6 | 0 | | | | 0 | 0 | 0 | | | | | | |
| Other | Triethylene Glycol | 0 | 0 | | | | 0 | 3.2 | 0 | | | | | | |
| | Water | 0 | 0.9 | | | | 0.7 | 0.7 | 0.9 | | | | | | |
| Additive | BYK-067A | 0 | 0 | | | | 0 | 0 | 0.3 | | | | | | |
| | Molar Ratio (Basic Group/Formic Acid) | 0.96 | 1.00 | | | | 0.70 | 1.00 | 1.00 | | | | | | |
| Sintering Conditions | Temperature (° C.) | 300 | 300 | 250 | 200 | 180 | 250 | 250 | 300 | 250 | 200 | 180 | 250 | 250 | 250 |
| | Time (min) | 30 | 30 | 30 | 30 | 30 | 30 | 30 | 30 | 30 | 30 | 30 | 30 | 30 | 30 |
| | Pressurizing Condition (Mpa) | 0.4 | 0.4 | 0.4 | 0.4 | 0.4 | 0.4 | 0.4 | 0.4 | 0.4 | 0.4 | 0.4 | 0.1 | 0.05 | 0 |
| Bonding strength (MPa) | | 22 | 38 | 35 | 30 | 21 | 28 | 23 | 40 | 33 | 31 | 26 | 39 | 30 | 20 |

To summarize the above, configurations of the present disclosure and their variations will be described in addition below.

[1] A dispersion medium for metal particle sintering, the dispersion medium containing formic acid and a basic compound, the basic compound being a nitrogen-containing compound represented by Formula (1), and a molar ratio (basic group/formic acid) of basic groups included in the basic compound to formic acid being from 0.50 to 1.20.

[2] The dispersion medium for metal particle sintering according to [1], wherein $R^a$ to $R^c$ in Formula (1) above is an aliphatic hydrocarbon group.

[3] The dispersion medium for metal particle sintering according to [2], wherein the aliphatic hydrocarbon group is a linear or branched alkyl group.

[4] The dispersion medium for metal particle sintering according to [2], wherein the aliphatic hydrocarbon group is a linear alkyl group having from 2 to 12 carbons (preferably from 2 to 8 carbons, more preferably from 2 to 4 carbons), or a branched alkyl group having from 3 to 12 carbons (preferably from 3 to 8 carbons, more preferably from 3 to 6 carbons).

[5] The dispersion medium for metal particle sintering according to any one of [1] to [4], wherein a total number of amino groups, N-substituted amino groups, or N,N-substituted amino groups that may be contained in $R^a$ to $R^c$ in Formula (1) above is from 0 to 6 (preferably from 1 to 4, more preferably from 1 to 2).

[6] The dispersion medium for metal particle sintering according to any one of [1] to [5], wherein a total number of imino groups or N-substituted imino groups that may be contained in $R^a$ to $R^c$ in Formula (1) above is from 0 to 4 (preferably from 1 to 3, more preferably from 1 to 2).

[7] The dispersion medium for metal particle sintering according to any one of [1] to [6], wherein a total number of hydroxyl groups that may be contained in $R^a$ to $R^c$ in Formula (1) above is from 0 to 6 (preferably from 1 to 4, more preferably from 1 to 2).

[8] The dispersion medium for metal particle sintering according to [2], wherein a ring that may be formed by any two of $R^a$ to R in Formula (1) above bonding with each other and the adjacent nitrogen atom is at least one selected from the group consisting of a pyrrolidine ring, a pyrroline ring, a piperidine ring, a pyrrole ring, an imidazolidine ring, an imidazole ring, a piperazine ring, an imidazolidine ring, a pyridine ring, a diazine ring, and a triazine ring.

[9] The dispersion medium for metal particle sintering according to [8], wherein the ring is an imidazole ring.

[10] The dispersion medium for metal particle sintering according to [1], wherein the basic compound is at least one compound selected from the group consisting of an alkylamine, a dialkanolamine, a trialkanolamine, an aminoalkanediol, a diamine, a triamine, a diaminoalkanol, an imidazole compound, a pyridine compound, a diazine compound, and a triazine compound.

[11] The dispersion medium for metal particle sintering according to [1], wherein the basic compound is at least one compound selected from the group consisting of an alkylamine, a dialkanolamine, a trialkanolamine, a diamine, a triamine, a diaminoalkanol, and an imidazole compound.

[12] The dispersion medium for metal particle sintering according to [1], wherein the basic compound is at least one compound selected from the group consisting of triethylamine, diethanolamine, triethanolamine, N,N-diethyl-1,3-propanediamine, N,N,N,N'',N''-pentamethyldiethylenetriamine, N,N'-dimethylpiperazine, 1-(2-aminoethyl)-4-methylpiperazine, and N-methylimidazole.

[13] The dispersion medium for metal particle sintering according to any one of [1] to [12], wherein the molar ratio (basic group/formic acid) is from 0.55 to 1.15 (preferably from 0.60 to 1.10).

[14] A method for producing the dispersion medium for metal particle sintering according to any one of [1] to [13], the method including a step of mixing and dissolving the formic acid and the basic compound in each other.

[15] An electroconductive paste containing metal particles and the dispersion medium according to any one of [1] to [13].

[16] The electroconductive paste according to [15], wherein a viscosity (25° C., a shear rate of 10 s$^{-1}$) of the electroconductive paste measured by a rheometer immediately after mixing the dispersion medium and the metal particles is from 10 to 1000 Pa·s (preferably from 50 to 900 Pa·s, more preferably from 100 to 800 Pa.$).

[17] The electroconductive paste according to [15] or [16], wherein a viscosity (25° C., a shear rate of 10 s$^{-1}$)

of the electroconductive paste measured by a rheometer after storage for 7 days at 25° C. is from 4 to 10000 Pa·s (preferably from 20 to 4500 Pa·s, more preferably from 50 to 2400 Pa·s).

[18] The electroconductive paste according to any one of [15] to [17], wherein a viscosity (25° C., a shear rate of 10 s$^{-1}$) of the electroconductive paste measured by a rheometer after storage for 7 days at 5° C. is from 4 to 10000 Pa s (preferably from 20 to 4500 Pa·s, more preferably from 50 to 2400 Pa·s).

[19] The electroconductive paste according to any one of [15] to [18], wherein a viscosity (25° C., a shear rate of 10 s$^{-1}$) of the electroconductive paste measured by a rheometer after storage for 14 days at 25° C. is from 4 to 10000 Pa·s (preferably from 20 to 4500 Pa·s, more preferably from 50 to 2400 Pa·s).

[20] The electroconductive paste according to any one of [15] to [19], wherein a viscosity (25° C., a shear rate of 10 s$^{-1}$) of the electroconductive paste measured by a rheometer after storage for 14 days at 5° C. is from 4 to 10000 Pa·s (preferably from 20 to 4500 Pa·s, more preferably from 50 to 2400 Pa·s).

[21] The electroconductive paste according to any one of [15] to [20], wherein a viscosity ratio (viscosity after storage/viscosity immediately after mixing) is 10.0 or less, the viscosity after storage being the viscosity (25° C. a shear rate of 10 s$^{-1}$) of the electroconductive paste measured by a rheometer after storage at 25° C. or lower for 7 days, the viscosity immediately after mixing being the viscosity (25° C., a shear rate of 10 s$^{-1}$) of the electroconductive paste measured by a rheometer immediately after mixing the dispersion medium and the metal particles.

[22] The electroconductive paste according to any one of [15] to [22], wherein a viscosity ratio (viscosity after storage/viscosity immediately after mixing) is 10.0 or less (preferably from 0.4 to 5.0, more preferably from 0.5 to 3.0), the viscosity after storage being the viscosity (25° C. a shear rate of 10 s$^{-1}$) of the electroconductive paste measured by a rheometer after storage at 25° C. for 7 days, the viscosity immediately after mixing being the viscosity (25° C., a shear rate of 10 s$^{-1}$) of the electroconductive paste measured by a rheometer immediately after mixing the dispersion medium and the metal particles.

[23] The electroconductive paste according to any one of [15] to [22], wherein a maximum peak temperature in a derivative thermogravimetry (DTG) in a nitrogen atmosphere with a temperature increase rate of 10° C./min is from 100 to 220° C. (preferably from 110 to 210° C., more preferably from 120 to 200° C.).

[24] The electroconductive paste according to any one of [15] to [23], wherein the metal particles are at least one type selected from the group consisting of copper particles, silver particles, and particles of an oxide thereof.

[25] The electroconductive paste according to any one of [15] to [23], wherein the metal particles are copper particles and/or silver particles.

[26] The electroconductive paste according to 1241 or [25], wherein a weight ratio (copper particles/total metal particles) of the copper particles to the total metal particles is from 0.35 to 0.90 (preferably from 0.40 to 0.87, more preferably from 0.45 to 0.84).

[27] The electroconductive paste according to any one of [15] to [26], wherein a volume average particle size of the metal particles is from 1 nm to 100 μm (preferably from 10 nm to 50 μm, more preferably from 30 nm to 35 μm, even more preferably from 50 nm to 10 μm, and particularly preferably from 70 nm to 1 μm).

[28] The electroconductive paste according to any one of [15] to [26], wherein the metal particles are a combination of two or more metal particles having different volume average particle sizes selected from the group consisting of nano-sized particles (having a volume average particle size of 1 nm or greater and less than 300 nm, preferably from 1 to 200 nm, and more preferably from 1 to 150 nm), sub-nano-sized particles (having a volume average particle size of 0.30 μm or greater and less than 1.00 μm, preferably from 0.40 to 0.95 μm, and more preferably from 0.50 to 0.90 μm), and micro-sized particles (having a volume average particle size from 1.0 to 100 μm, preferably from 1.5 to 50 μm, more preferably from 2.0 to 35 μm, further preferably from 2.5 to 10 μm, and particularly preferably from 3.0 to 10 μm).

[29] The electroconductive paste according to [28], wherein a weight ratio (nano-sized particles/total metal particles) of the nano-sized particles to the total metal particles is from 0.10 to 0.90 (preferably from 0.15 to 0.85, more preferably from 0.20 to 0.80).

[30] The electroconductive paste according to any one of [15] to [29], wherein a content of the metal particles is from 70 to 99 wt. % (preferably from 72 to 95 wt. %, more preferably from 74 to 93 wt. %, even more preferably from 76 to 95 wt. %, particularly preferably from 78 to 93 wt. %).

[31] The electroconductive paste according to any one of [15] to [30], wherein a content of the formic acid is from 4.0 to 8.9 wt. % (preferably from 4.3 to 8.0 wt. %, more preferably from 4.5 to 7.5 wt. %) and a content of the basic compound is from 6.5 to 12.0 wt. % (preferably from 6.6 to 11.8 wt. %, more preferably from 6.7 to 11.5 wt. %).

[32] The electroconductive paste according to any one of [15] to [31], wherein a content of the formic acid is from 4.0 to 8.9 wt. % (preferably from 4.3 to 8.0 wt. %, more preferably from 4.5 to 7.5 wt. %) and a weight ratio (basic compound/formic acid) of the basic compound to the formic acid is from 0.70 to 3.50 (preferably from 0.72 to 3.40, more preferably from 0.74 to 3.30).

[33] The electroconductive paste according to any one of [15] to [32], wherein a content of the basic compound is from 6.5 to 12.0 wt. % (preferably from 6.6 to 11.8 wt. %, more preferably from 6.7 to 11.5 wt. %) and a weight ratio (basic compound/formic acid) of the basic compound to the formic acid is from 0.70 to 3.50 (preferably from 0.72 to 3.40, more preferably from 0.74 to 3.30).

[34] A method for producing the electroconductive paste according to any one of [15] to [33], the method including a step of mixing the metal particles and the dispersion medium.

[35] A use of a dispersion medium containing formic acid and a basic compound as described below as a dispersion medium for metal particle sintering.

Basic compound: A nitrogen-containing compound represented by Formula (1)

[36] A use of a composition containing metal particles and a dispersion medium as described below as an electroconductive paste.

Dispersion medium: Containing formic acid and a basic compound, the basic compound being a nitrogen-containing compound represented by Formula (1), and a molar ratio (basic group/formic acid) of basic groups included in the basic compound to formic acid being from 0.50 to 1.20.

INDUSTRIAL APPLICABILITY

The dispersion medium for metal particle sintering according to an embodiment of the present disclosure can reduce metal particles and promote sintering even when not in a reducing atmosphere, can ensure the storage stability of the electroconductive paste, and can prevent drying of the electroconductive paste. Further, the electroconductive paste according to an embodiment of the present disclosure can be sintered even at a low temperature of approximately 200° C. because the amount of organic residue can be very small; in addition, a high bonding strength can be achieved even at a slight pressure of 1 MPa or less. Thus, the present disclosure is industrially applicable.

The invention claimed is:

1. A dispersion medium for metal particle sintering, the metal particle being at least one type selected from the group consisting of copper particles, copper alloy particles, and copper oxide particles,
the dispersion medium comprising formic acid and a basic compound,
wherein the basic compound is a nitrogen-containing compound represented by the following Formula (1)

[Formula 1]

(1)

where $R^a$ to $R^c$ are the same or different and each represent a hydrogen atom or a hydrocarbon group that may have a substituent, provided that $R^a$ to $R^c$ are not hydrogen atoms at the same time;
at least one of $R^a$ to $R^c$ satisfies at least one of the following (i) to (iii):
  (i) at least one selected from the group consisting of a linear or branched alkyl group having 3 to 12 carbons, a linear or branched alkenyl group, a linear or branched alkynyl group, a linear or branched alkylidene group, a cycloalkyl group and a cycloalkenyl group;
  (ii) an aromatic hydrocarbon group having 6 to 18 carbons; and
  (iii) at least one substituted hydrocarbon group selected from the group consisting of an amino group, a N-substituted amino group, a N,N-substituted amino group, an imino group, a N-substituted imino group and a hydroxyl group;
the double line including a dashed line represents a single bond or a double bond, with $R^c$ being absent in the case of a double bond; and
any two of $R^a$ to $R^c$ may bond with each other and form a ring together with the adjacent nitrogen atom, and
a molar ratio (basic group/formic acid) of basic groups included in the basic compound to formic acid being from 0.50 to 1.20, and the basic group is a nitrogen-containing group.

2. The dispersion medium for metal particle sintering according to claim 1, wherein the basic compound is at least one compound selected from the group consisting of triethylamine, N,N-diethyl-1,3-propanediamine, N,N,N',N",N"-pentamethyldiethylenetriamine, N,N'-dimethylpiperazine, 1-(2-aminoethyl)-4-methylpiperazine, and N-methylimidazole.

3. An electroconductive paste comprising metal particles and a dispersion medium,
the dispersion medium comprising formic acid and a basic compound,
wherein the basic compound is a nitrogen-containing compound represented by the following Formula (1):

(1)

wherein $R^a$ to $R^c$ are the same or different and each represent a hydrogen atom or a hydrocarbon group that may have a substituent;
  wherein the substituent is the same or different, and is at least one group selected from the group consisting of an amino group, an N-substituted amino group, an N,N-substituted amino group, an imino group, an N-substituted imino group, and a hydroxyl group;
provided that $R^a$ to $R^c$ are not hydrogen atoms at the same time;
wherein the double line including a dashed line represents a single bond or a double bond, with $R^c$ being absent in the case of a double bond;
wherein any two of $R^a$ to $R^c$ optionally bond with each other and form a ring together with the adjacent nitrogen atom; and
wherein a molar ratio (basic group/formic acid) of basic groups included in the basic compound to formic acid being from 0.50 to 1.20, and the basic group is a nitrogen-containing group.

4. The electroconductive paste according to claim 3, wherein a viscosity (25° C., a shear rate of 10 s$^{-1}$) of the electroconductive paste measured by a rheometer immediately after mixing the dispersion medium and the metal particles is from 10 to 1000 Pa·s.

5. The electroconductive paste according to claim 3, wherein a viscosity ratio (viscosity after storage/viscosity immediately after mixing) is 10.0 or less, the viscosity after storage being a viscosity at 25° C. and a shear rate of 10 s$^{-1}$ (viscosity (25° C., a shear rate of 10 s$^{-1}$)) of the electroconductive paste measured by a rheometer after storage at 25° C. or lower for 7 days, the viscosity immediately after mixing being a viscosity (25° C., a shear rate of 10 s$^{-1}$) of the electroconductive paste measured by a rheometer immediately after mixing the dispersion medium and the metal particles.

6. The electroconductive paste according to claim 3, wherein a viscosity ratio (viscosity after storage/viscosity immediately after mixing) is 10.0 or less, the viscosity after storage being a viscosity (25° C., a shear rate of 10 s$^{-1}$) of the electroconductive paste measured by a rheometer after storage at 25° C. or lower for 14 days, the viscosity immediately after mixing being a viscosity (25° C., a shear rate of 10 s$^{-1}$) of the electroconductive paste measured by a rheometer immediately after mixing the dispersion medium and the metal particles.

7. The electroconductive paste according to claim 3, wherein a maximum peak temperature in a derivative thermogravimetry (DTG) in a nitrogen atmosphere with a temperature increase rate of 10° C./min is from 100 to 220° C.

8. The electroconductive paste according to claim 3, wherein the metal particles are at least one type selected from the group consisting of copper particles, copper alloy particles, and copper oxide particles.

9. The electroconductive paste according to claim 8, wherein a weight ratio (copper particles/total metal particles) of the copper particles to the total metal particles is from 0.35 to 0.90.

10. The electroconductive paste according to claim 3, wherein a volume average particle size of the metal particles is from 1 nm to 100 μm.

11. The electroconductive paste according to claim 3, wherein the metal particles have two or more different volume average particle sizes selected from the group consisting of nano-sized particles having a volume average particle size from 1 to 200 nm, sub-nano-sized particles having a volume average particle size from 0.30 to 0.90 μm, and micro-sized particles having a volume average particle size from 1.0 to 100 μm.

12. The electroconductive paste according to claim 11, wherein a weight ratio (nano-sized particles/total metal particles) of the nano-sized particles to the total metal particles is from 0.10 to 0.90.

13. The electroconductive paste according to claim 3, wherein a content of the metal particles is from 70 to 99 wt. %.

14. The electroconductive paste according to claim 3, wherein a content of the formic acid is from 4.0 to 8.9 wt. % and a content of the basic compound is from 6.5 to 12.0 wt. %.

15. The electroconductive paste according to claim 3, wherein a content of the basic compound is from 6.5 to 12.0 wt. % and a weight ratio (basic compound/formic acid) of the basic compound to the formic acid is from 0.70 to 3.50.

16. The electroconductive paste according to claim 3, wherein the basic compound is at least one compound selected from the group consisting of triethylamine, diethanolamine, triethanolamine, N,N-diethyl-1,3-propanediamine, N,N,N',N",N"-pentamethyldiethylenetriamine, N,N'-dimethylpiperazine, 1-(2-aminoethyl)-4-methylpiperazine, and N-methylimidazole.

17. The electroconductive paste according to claim 3, wherein a content of a resin component is 5 wt. % or less.

18. A dispersion medium for metal particle sintering, the metal particle being at least one type selected from the group consisting of copper particles, copper alloy particles, and copper oxide particles,
the dispersion medium comprising formic acid and a basic compound,
wherein the basic compound is a nitrogen-containing compound represented by the following Formula (1)

where $R^a$ to $R^c$ are the same or different and each represent a hydrogen atom or a hydrocarbon group that may have a substituent, provided that $R^a$ to $R^c$ are not hydrogen atoms at the same time;
the substituent is the same or different, and is at least one group selected from the group consisting of an amino group, an N-substituted amino group, an N,N-substituted amino group, an imino group, an N-substituted imino group, and a hydroxyl group;
when $R^a$ to $R^c$ are simultaneously an unsubstituted hydrocarbon group, at least one of $R^a$ to $R^c$ is a hydrocarbon group having 3 to 12 carbons;
the double line including a dashed line represents a single bond or a double bond, with $R^c$ being absent in the case of a double bond; and
any two of $R^a$ to $R^c$ may bond with each other and form a ring together with the adjacent nitrogen atom, and
a molar ratio (basic group/formic acid) of basic groups included in the basic compound to formic acid being from 0.50 to 1.20, the basic group is a nitrogen-containing group.

* * * * *